B. W. TUCKER.
CLOTHESPIN MACHINE.
APPLICATION FILED AUG. 19, 1919.

1,344,217.

Patented June 22, 1920.
10 SHEETS—SHEET 1.

Inventor
Benjamin W. Tucker
By his Attorneys
Criswell & Davis

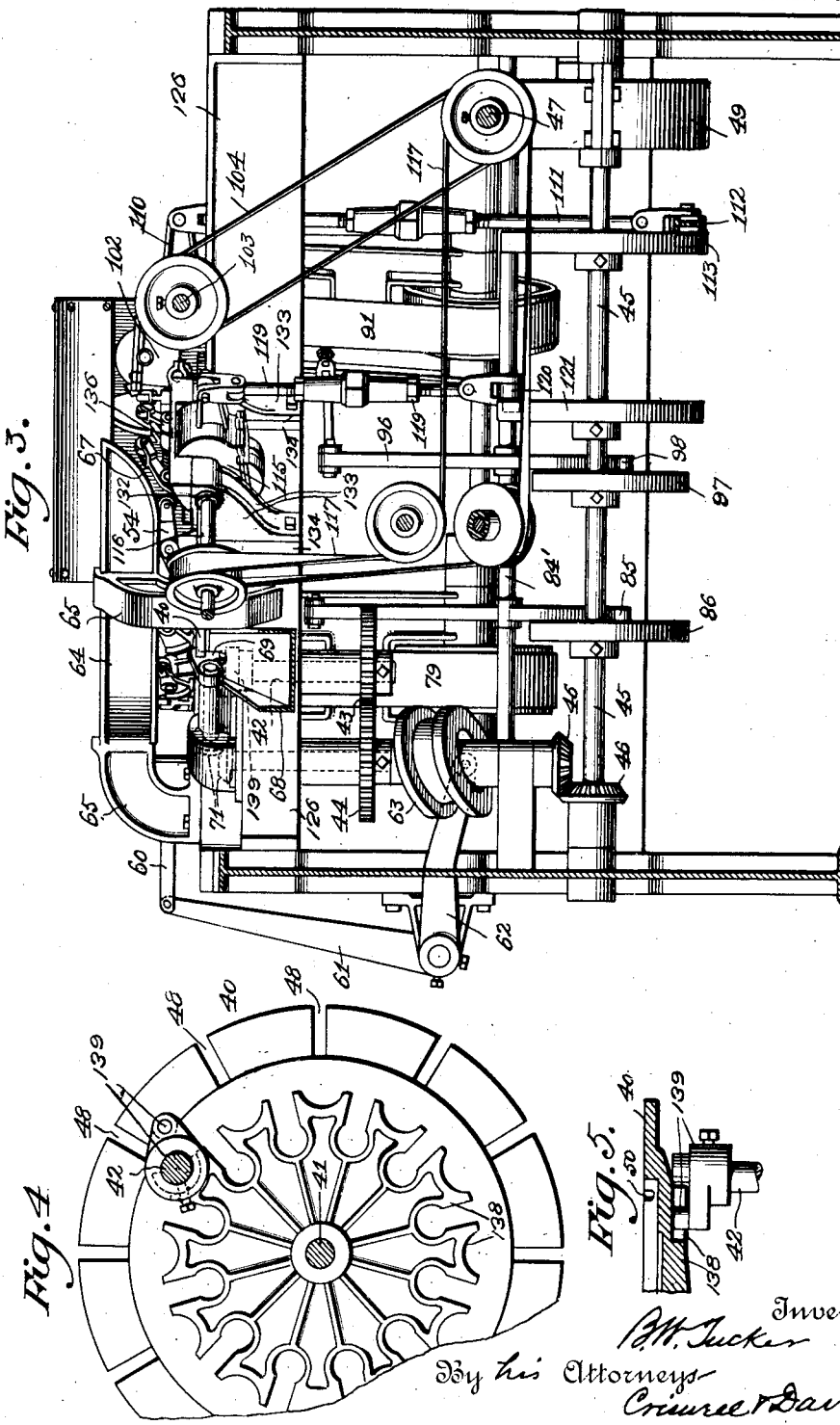

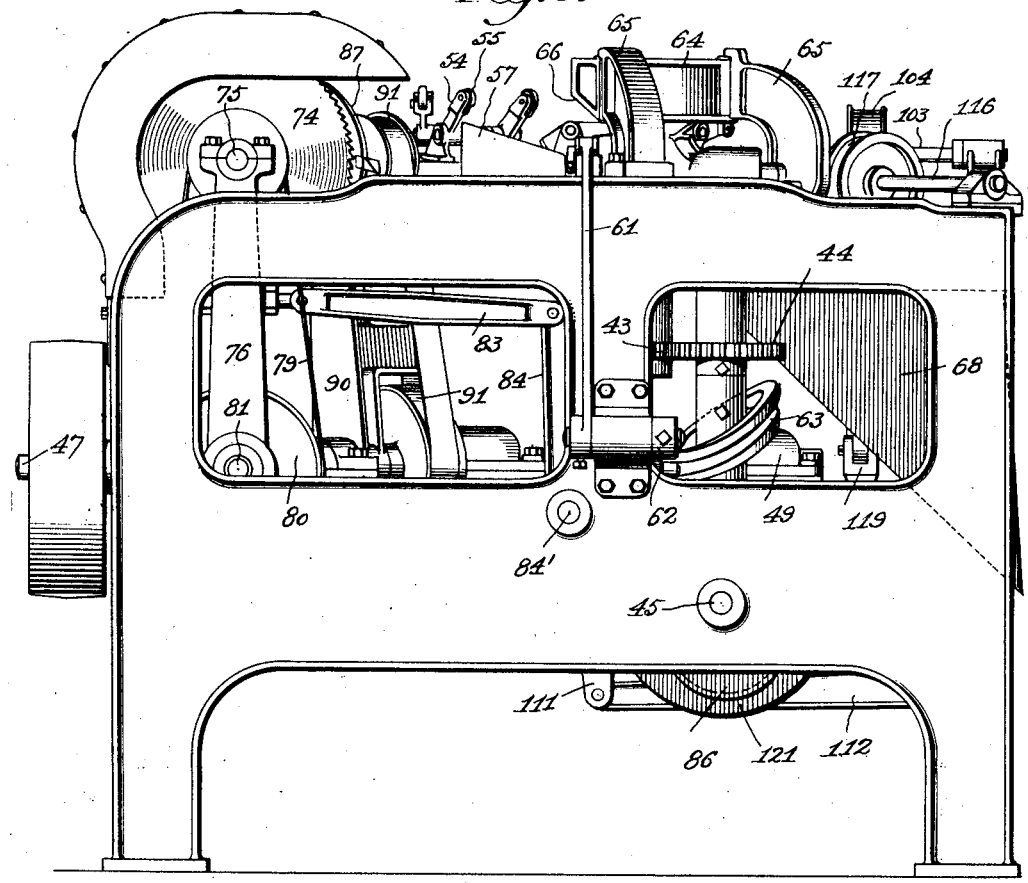
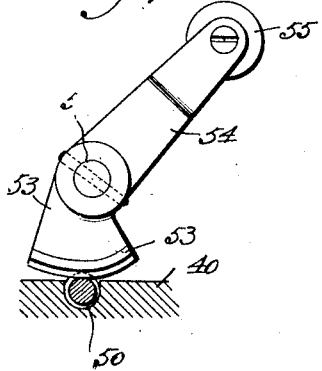
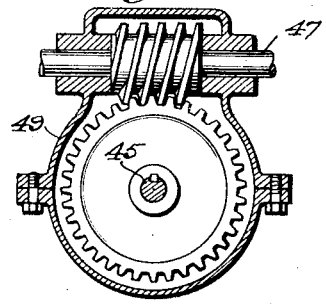
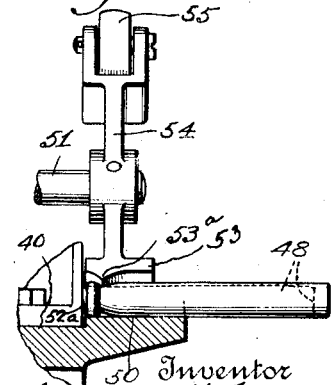

B. W. TUCKER.
CLOTHESPIN MACHINE.
APPLICATION FILED AUG. 19, 1919.
1,344,217.
Patented June 22, 1920.
10 SHEETS—SHEET 4.
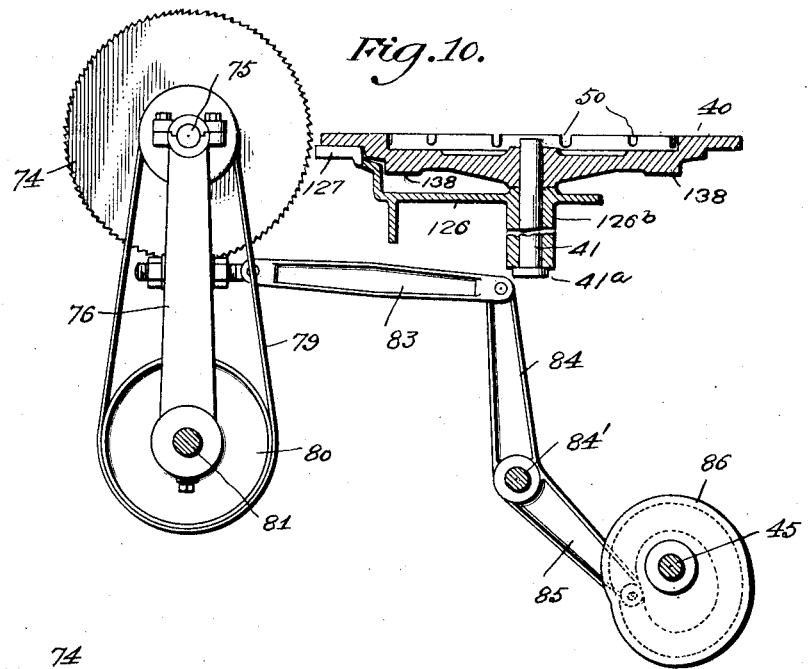
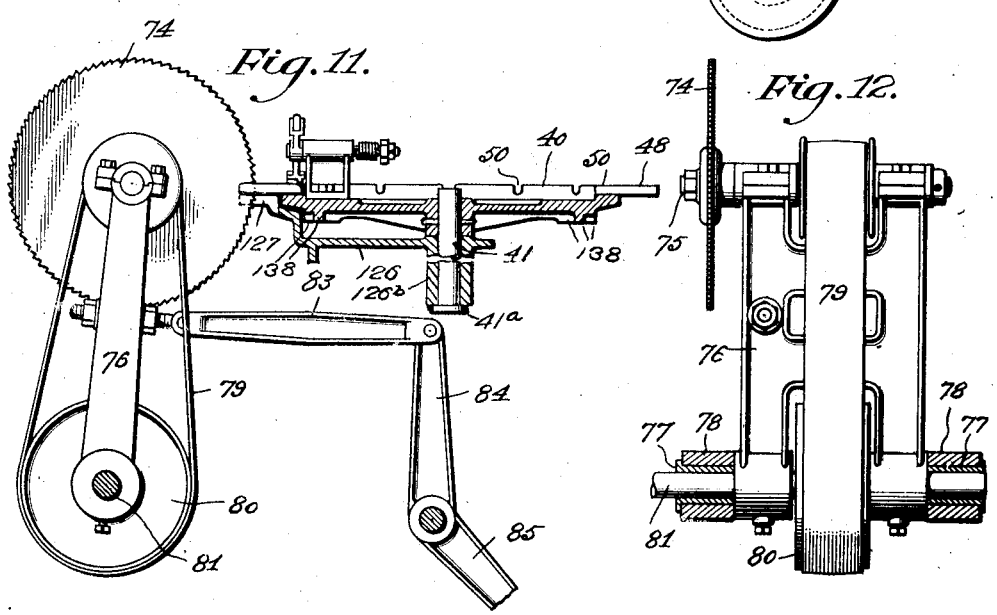
Inventor
Benjamin W. Tucker
By his Attorneys
Criswell & Davis B. W. TUCKER.
CLOTHESPIN MACHINE.
APPLICATION FILED AUG. 19, 1919.
1,344,217.
Patented June 22, 1920.
10 SHEETS—SHEET 5.
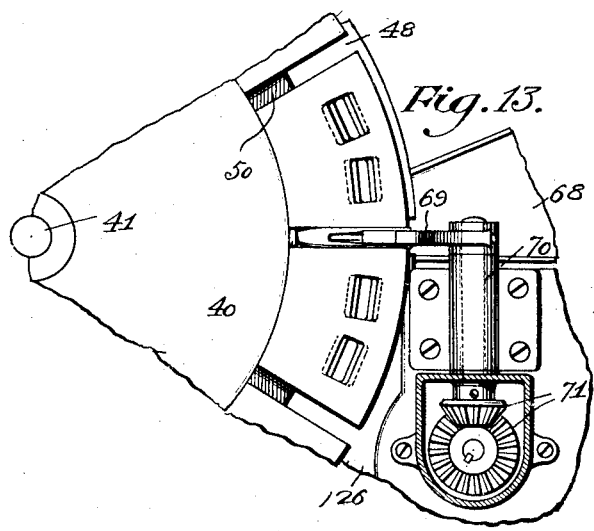
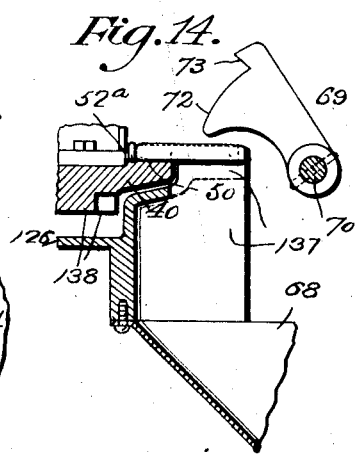
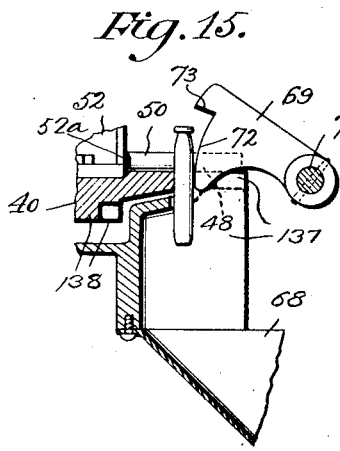
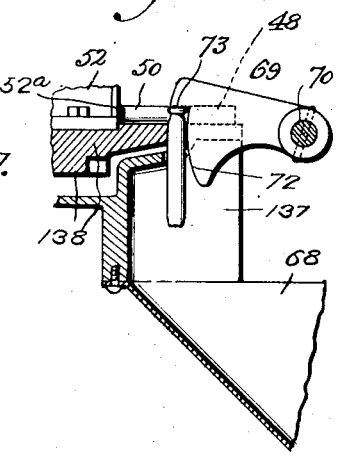
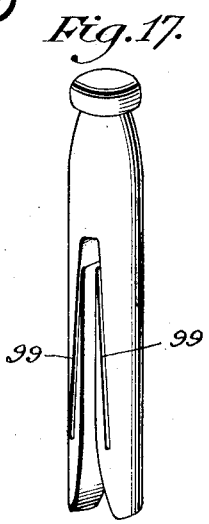
Inventor
B. W. Tucker
By his Attorneys
Criswell & Davis B. W. TUCKER.
CLOTHESPIN MACHINE.
APPLICATION FILED AUG. 19, 1919.
1,344,217.
Patented June 22, 1920.
10 SHEETS—SHEET 6.
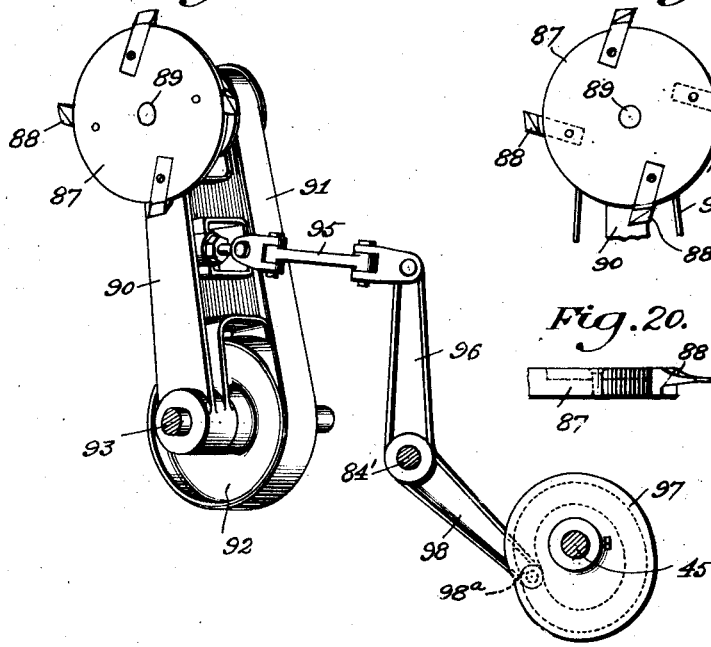
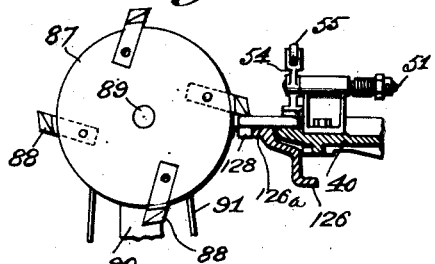
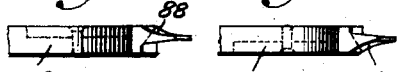
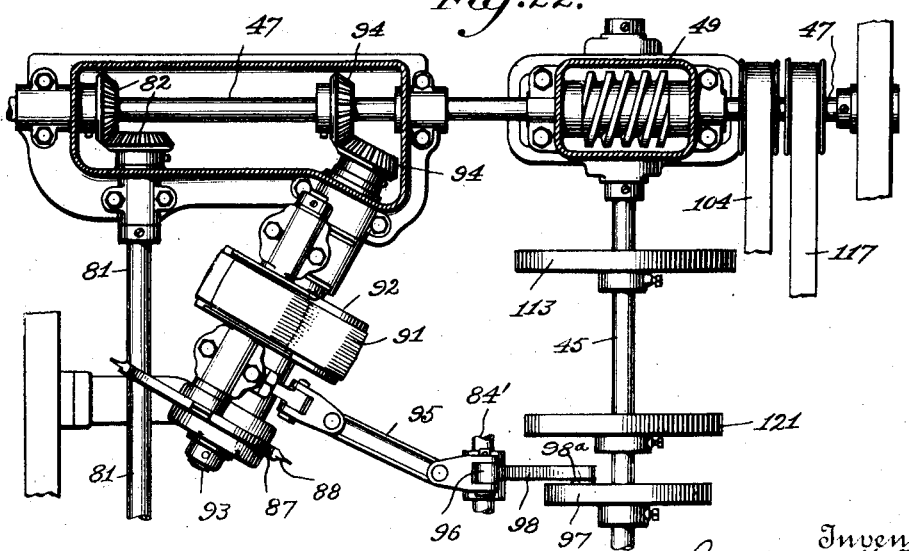

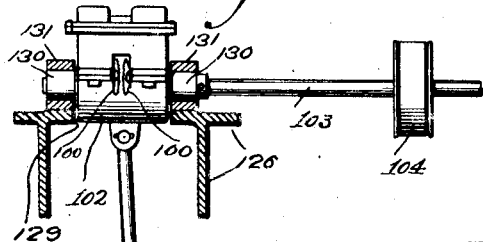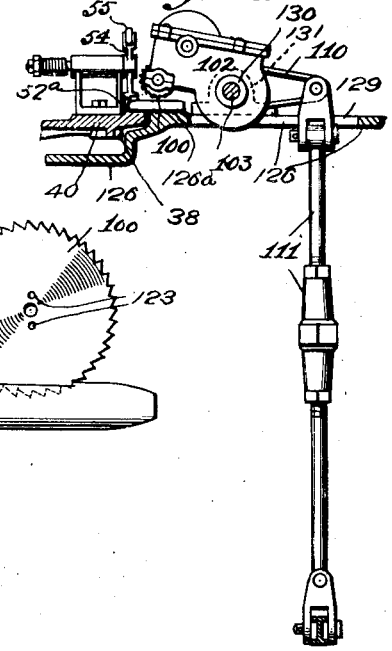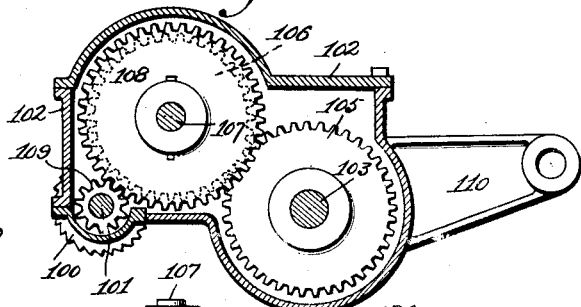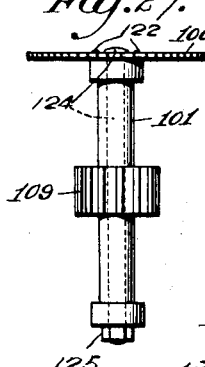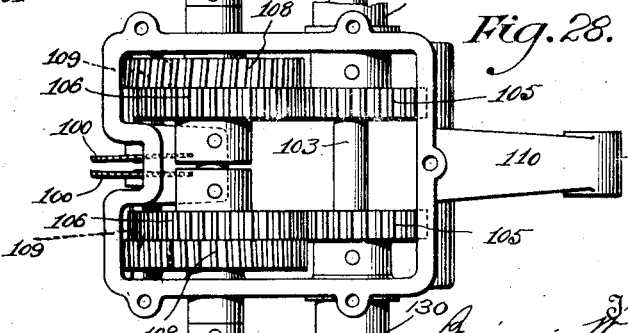

B. W. TUCKER.
CLOTHESPIN MACHINE.
APPLICATION FILED AUG. 19, 1919.
1,344,217.
Patented June 22, 1920.
10 SHEETS—SHEET 8.
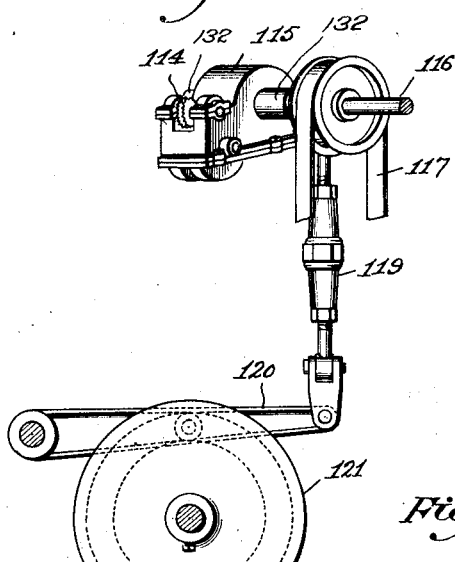
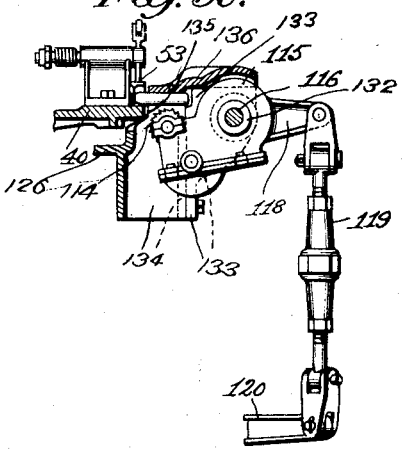
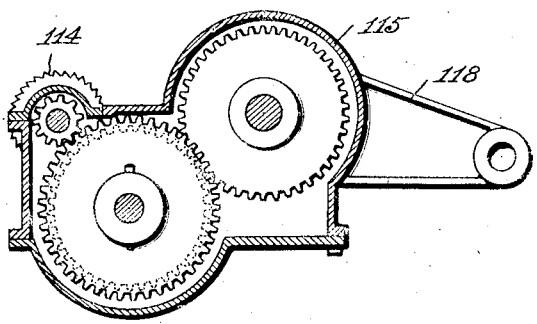

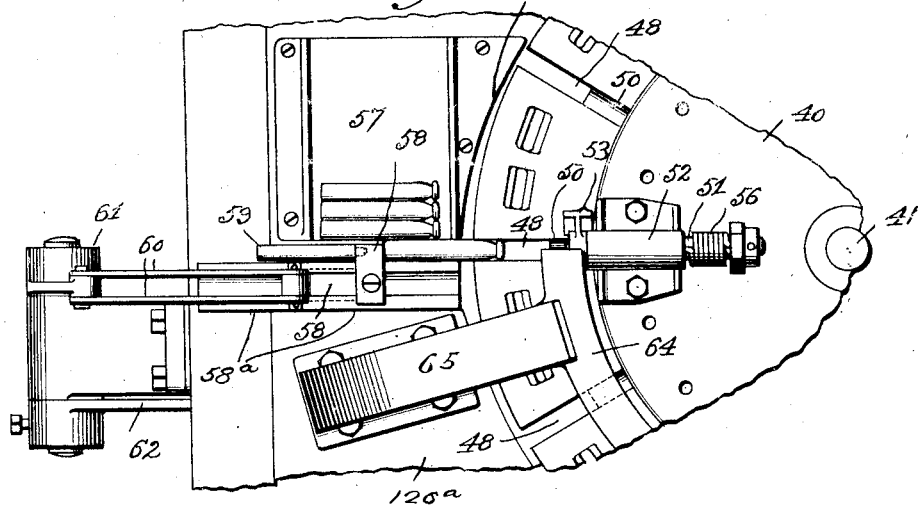
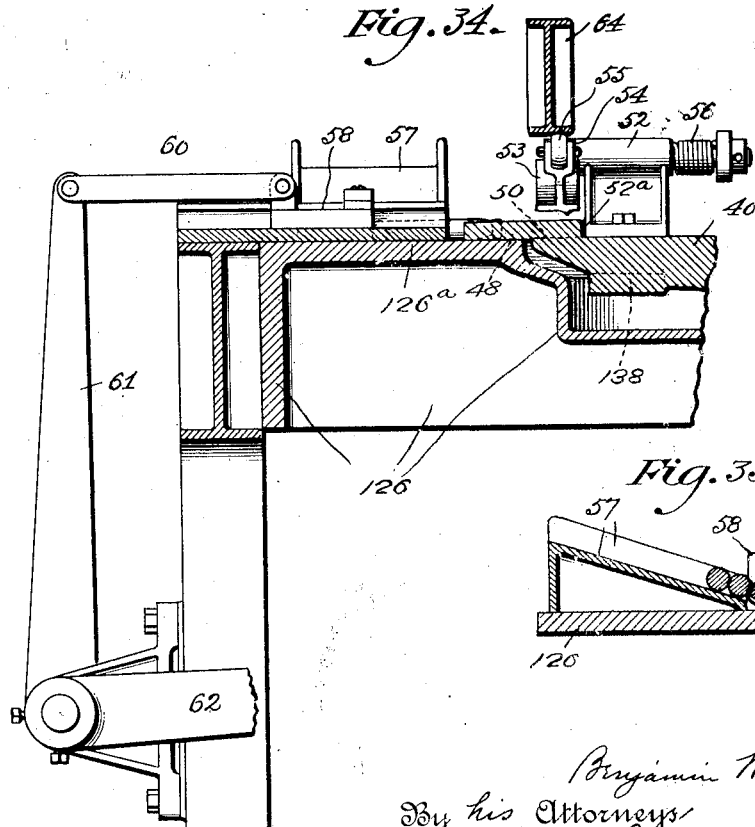

B. W. TUCKER.
CLOTHESPIN MACHINE.
APPLICATION FILED AUG. 19, 1919.

1,344,217.

Patented June 22, 1920.
10 SHEETS—SHEET 10.

Inventor
Benjamin W. Tucker
By Criswell & Davis
Attorneys

UNITED STATES PATENT OFFICE.

BENJAMIN W. TUCKER, OF SOUTH ORANGE, NEW JERSEY, ASSIGNOR TO HENRY J. KAHRS, OF NEW YORK, N. Y.

CLOTHESPIN-MACHINE.

1,344,217.  Specification of Letters Patent.  Patented June 22, 1920.

Application filed August 19, 1919. Serial No. 318,452.

*To all whom it may concern:*

Be it known that I, BENJAMIN W. TUCKER, a citizen of the United States, and resident of South Orange, county of Essex, and State of New Jersey, have invented certain new and useful Improvements in Clothespin-Machines, of which the following is a specification.

The object of the invention is to provide a machine for automatically producing wooden clothes-pins of the special type covered by Bodri Patent No. 1,274,236, dated July 30, 1918, which consists of a clothes-pin of the ordinary shape except that in addition to the main slot it is provided with a pair of supplemental slots, as substantially shown in Fig. 17 of the drawings annexed, to provide a pair of spring tongues tapering toward the head of the clothes-pin and forming a supplemental yielding clamp within the main clamping members of the pin, as more fully hereinafter set forth.

Figure 1:
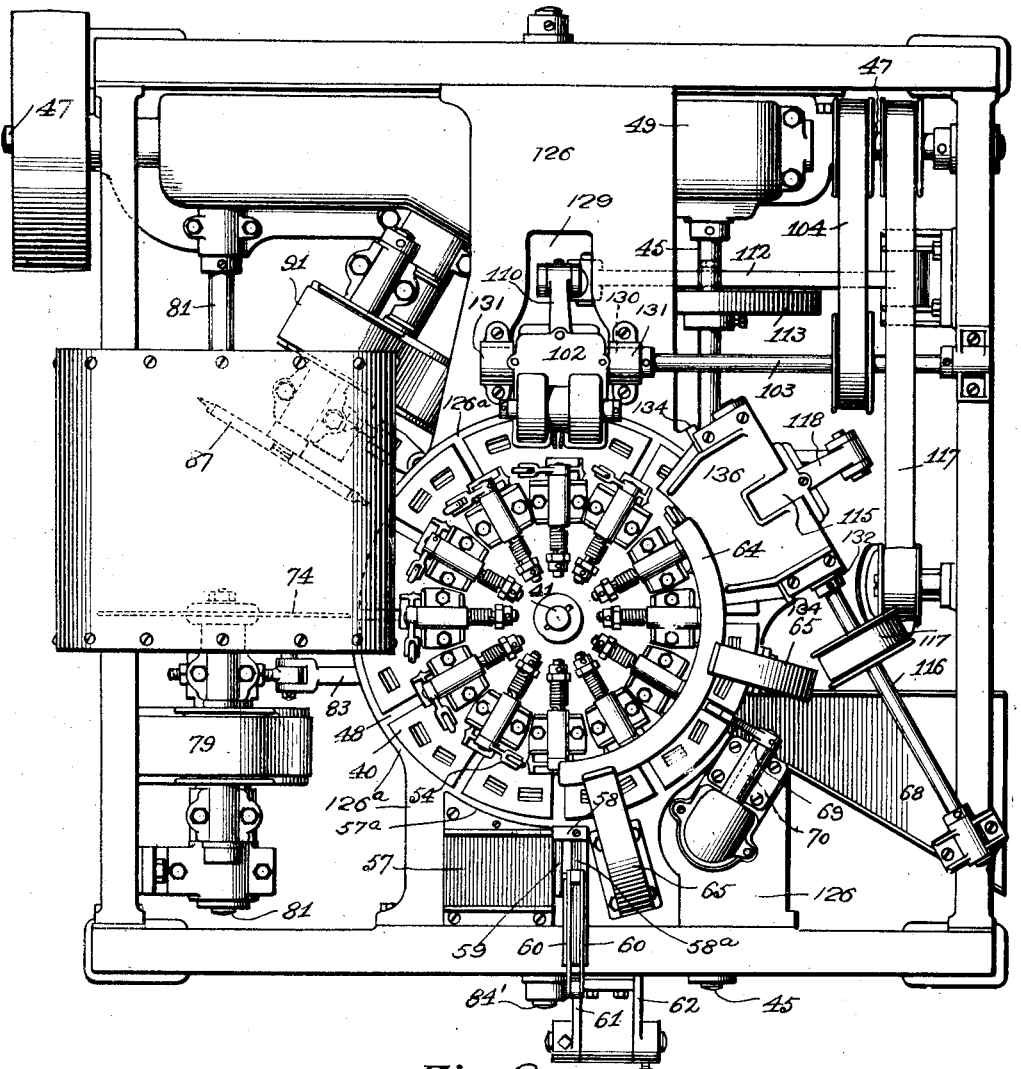
Figure 2:
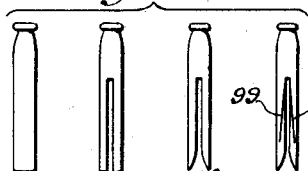
Figure 36:
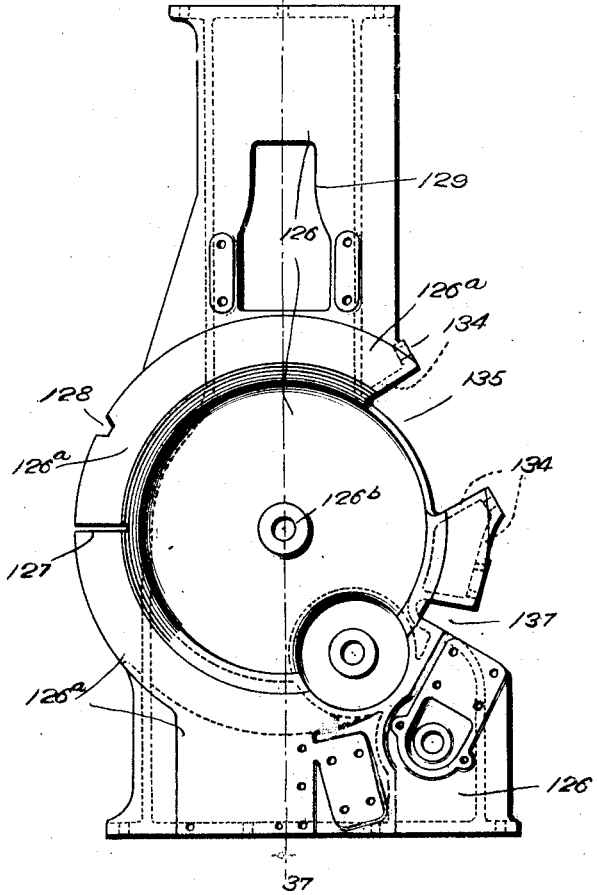

In the drawings, Figure 1 is a plan view of the machine;

Fig. 2 a group view showing the clothespin as it appears in various stages of its manufacture;

Fig. 3 an elevation of the discharge side of the machine, the discharge spout being shown at 68 and the near parts of the frame being sectioned away to better show the operating mechanism;

Figs. 4 and 5 are detail views of the turn-table and Geneva movement for intermittently rotating the same;

Fig. 6 a front elevation of the machine, the feeding-in chute being shown at 57;

Figs. 7 to 35 inclusive, details of various mechanisms which are more fully hereinafter described;

Fig. 36 a plan view of the bed plate; and

Figure 37:
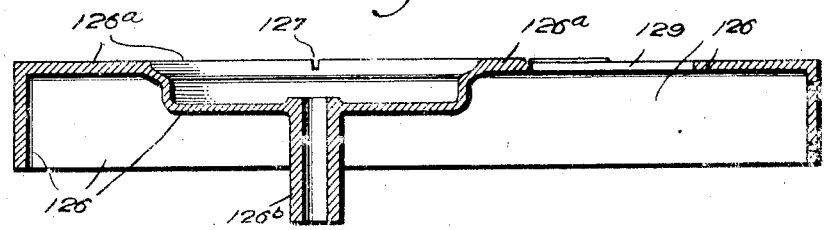

Fig. 37 a vertical sectional view of the bed plate on the line 37—37 of Fig. 36.

The main element of the machine is a horizontal turntable 40 affixed to the upper end of a freely-rotatable vertical shaft 41 provided with a head or collar 41ª at its lower end and journaled in a suitable bearing sleeve 126ᵇ formed on a bed plate 126 mounted in the frame of the machine. The turntable is intermittently rotated by a Geneva movement, shown in Figs. 4 and 5. The Geneva gear 138 is formed on the under side of the turntable and is operated in the usual manner by a suitable driver element 139 fixed on the upper end of a vertical shaft 42 driven through the medium of a pair of gears 43 and 44, the latter gear 44 being in turn driven from a main cam shaft 45 by a pair of bevel gears 46. This cam shaft is continuously driven from the main drive shaft 47 by means of the worm gearing shown in Fig. 8, which gearing is inclosed in a casing 49.

The turntable is provided with a series of spaced radial slots 48, and at the inner end of each of these slots there is formed a radial groove or pocket 50 which forms virtually a continuation of the slot. The clothes-pins are adapted to fit in the slots 48 and have their headed ends rest in the saddle-like pockets or grooves 50, and associated with each pocket 50 is a clamping device adapted to clamp the pin down in the pocket while it is being operated upon by the mechanisms hereinafter described. Each clamping device consists of a rock shaft 51 extending radially of the turntable, journaled in a bearing 52 fastened to the top face of the turntable, the outer end of the shaft 51 having affixed to it an eccentric clamping member 53 which, when the shaft 51 turns, exerts a gradually increasing clamping action on the pin, said clamping member being formed with a rib 53ª on its under side shaped to fit in the groove at the head end of the pin blank and adapted to positively hold the blank against endwise movement, as shown particularly in Fig. 7. The bearing 52 is formed with a stop lug 52ª which projects slightly within the inner end of groove 50 and serves to properly position the pin blank relatively to the clamp 53. The clamp 53 has an upstanding arm 54 provided with a roller 55 on its upper end. The clamp 53 is normally turned through the medium of rock shaft 51 and a coil spring 56 in a direction to clamp the pin, and to release the pins from the action of this clamp it is simply necessary to press down the upper end of the arm 54, this being done by a mechanism hereinafter described.

The clothes-pins, as shown in Fig. 33, are pushed head end first into the slots 48, which slots register with the discharge end of the charging mechanism, this charging mechanism consisting of an inclined chute 57 down which the previously headed blanks roll, said chute being mounted on a bed plate 126. At the discharge end of this chute is arranged a reciprocating pusher head 58 which is supported on a suitable channeled guide block 58ª and, as the pins are discharged one by one from the chute 57, forces them endwisely into the alined slots 48 of the turntable, a rearwardly extending guard finger 59 being affixed to said head 58 to prevent discharge of pins from the chute at the rear of the head block during movement of the head block. The lower edge of the bottom of chute 57 is elevated slightly above the bed plate and is spaced from the guide block 58ª to form a discharge channel or guide into which the pins drop from the chute and in which the pusher head 58 travels. The pusher 58 is connected by a pair of links 60 to the upper end of an upper arm 61 of a bell-crank lever, the lower arm 62 of which extends into the machine and is actuated by a cam 63 affixed to the vertical shaft which carries the aforesaid gear 44, the mechanism being, of course, timed to actuate the blank pusher at the moment a slot 48 stops in alinement with the discharge end of the chute. As the turntable rotates to bring each slot 48 into position to receive a blank, the clamp 53 is held up in release position by means of an overhead arcuate cam-bar 64, under which the roller 55 passes as the clamp approaches the discharge chute hereinafter described, the cam-bar being long enough to hold the clamp in release position until after the slot 48 has received its blank, whereupon the clamp normally engages the headed end of the blank and holds it in position in the turntable throughout all the subsequent cutting operations. In order to insure the blank being in proper position to be gripped by the clamp 53 upon release of the clamp, the base of chute 57 is formed with a cam edge 57ª past which the outer end of the blank moves and which serves to re-position any blank which may accidentally move outwardly in slot 48 before roller 55 leaves the cam bar. The cam-bar 64 is supported on the inner end of the brackets 65 and its release end is beveled at 66 to prevent a too-sudden release of the clamping member, while its opposite end is beveled at 67 to facilitate the depression of the upstanding arm 54 of the clamp in the act of releasing the finished pin. After the pin is thus released, it is free to be discharged into the discharge chute 68, and to insure prompt discharge of the pin I provide a dislodging finger 69 which is constructed to first tilt the pin to a vertical position, as shown in Fig. 15, and then quickly discharge it vertically downward into the chute 68. This finger 69 is continuously rotated through the medium of shaft 70 and a pair of bevel gears 71, the driving one of these gears 71 being affixed to the same shaft that carries the gear 44, the mechanism being, of course, timed to cause the finger 69 to pass down through the pin-holding slot 48 during the dwell in the rotation of the turntable. The tilting of the pin is caused by a nose 72 formed on the finger, and the impact blow which insures the discharge of the pin from the turntable slot is given to the pin through the medium of extension or shoulder 73 formed on the finger, this blow being received by the pin at its headed end after it is tilted to vertical position by the cam nose 72. This positive discharge of the finished pins is especially desirable in view of the fact that the slots 48 are made to hug the pins quite closely so as to assist the clamp in supporting them during the sawing operations hereinafter described.

As the blank travels, step by step, from the receiving point to the discharge trough 68, it is subjected to four cutting operations. The first operation is, of course, to form the main slot in the pin, as shown in the second view in the group view, Fig. 2. This is performed by a circular saw 74 affixed to an arbor 75 which is journaled upon the upper end of a frame 76, the lower end of this frame being affixed to sleeves 77 which are journaled in bearings 78, to permit said frame 76 to freely swing toward and from the turntable. The saw-arbor is driven by a belt 79 from a drive pulley 80 affixed to a shaft 81, which shaft is driven from the main shaft 47 by gears 82. The frame 76 is oscillated through the medium of a link 83 connecting to the upper extremity of a bell-crank lever 84, which is pivotally mounted on a shaft 84' and has a depending arm 85 provided with a roller at its lower end which runs in the groove of a cam 86 affixed to the aforesaid cam shaft 45, the mechanism being timed so as to swing the rapidly rotating saw 74 toward and away from the turntable at each dwell thereof, during which time a blank pin will be presented to the saw, so that with each reciprocation of the saw a clothes-pin will have its main slot formed.

The next operation is to flare the outer end of the slot formed by the saw 74. This is done by a rotary cutter 87 provided with a series of tangential cutters 88 which are adapted to alternately shave off the interior walls of the slot near the end of the pin to give the mouth of the slot the usual flare shape. This cutter-head is mounted on an arbor 89 which is journaled on the upper end of a frame 90 and is driven by means of a belt 91 which receives its power from a pulley 92 affixed to a shaft 93, which shaft receives its power from main shaft 47 through the medium of bevel gears 94. The frame 90 is automatically swung toward and from the turntable by means of a cam-operated mechanism such as described for operating the main saw frame, namely, a link 95 pivotally connected with the upper arm 96 of an upstanding bell-crank lever pivotally mounted on the aforesaid shaft 84', and a cam 97 affixed to the cam shaft and provided with a cam groove in which a suitable trundle 98ª on the lower arm 98 of said bell-crank lever travels.

The next operation on the blank clothespin is to cut the two inclined kerfs 99. This is done by first partially cutting these kerfs through from the top side and then, further on in the rotation of the turntable, completing the sawing of these kerfs by means of an under-running pair of saws. The top saws and their mechanism are shown particularly in Figs. 23 to 28. A pair of saws 100 are removably held to short arbors 101 journaled in the walls of a gear box 102. The gear box is provided with trunnions 130 journaled in bearings 131 on bed plate 126. A shaft 103 lying tangentially to the turntable and extending over an opening 129 in the bed plate and through the trunnions 130, is driven from the main shaft 47 by a belt 104. Each saw 100 is held to rotate with its arbor 101, by a pair of pins or studs 122 on the arbor, which extend through apertures 123 in the saw, and each saw is detachably held in place by a bolt 124 which extends axially through the saw and arbor and has a nut 125 threaded on its outer end. Affixed to the shaft 103 within the gear box is a pair of gears 105, which gears mesh with a pair of gears 106 affixed to a counter-shaft 107 journaled in the gear box in parallelism with driving shaft 103. Affixed to the shaft 107 is a pair of spiral gears 108 which respectively mesh with spiral pinions 109 affixed respectively to the saw-arbors 101. The use of spiral gears for driving the saw-arbors is necessitated by the fact that the arbors are arranged at an angle to each other, the oblique arrangement of the saws with respect to each other being required by the position of the kerfs 99 these saws are intended to cut.

The gear box 102 is oscillated about the shaft 103 in the bearings 131 by an arm 110 affixed to the gear box and pivotally connected to the upper end of a link 111 which extends through an opening 129 in bed plate 126, the lower end of this link being connected to the end of a lever 112 which is vertically oscillated by means of a cam 113 affixed to the aforesaid cam shaft 45. With this arrangement, the saw-carrying end of the gear box is given a downward and upward movement with each dwell of the turntable, and the length of movement is such that the saws will cut the kerfs partially through the pin as shown in Fig. 31.

From the first set of kerf-cutting saws 100, the blank is carried to the second set of kerf-cutting saws 114 which are constructed and operated in the same way as the top cutting saws, except that they are arranged to swing upwardly against the under side of the blank to thus complete the kerf-cutting operations partially performed by the other set of saws.

The gearing for driving the under-running saws is mounted in a gear box 115 pivotally supported by suitable trunnions 132 journaled in bearings in brackets 133 bolted to flanges 134 formed on the bed plate 126. The saws 114 are supported and driven by mechanism similar to that employed in driving saws 100, from a shaft 116 which extends through the gear box 115 and trunnions 132 and is driven by a belt 117 from the main shaft 47. The gear box 115 is oscillated about shaft 116 by means of an arm 118 which is connected by a link 119 to an arm 120, which arm is vertically oscillated by means of a cam 121.

The bed plate 126 is rigidly supported in the main frame of the machine and is formed with a slightly raised, substantially annular pin-blank-supporting surface 126ª flush with the bottoms of grooves 50 in the turntable. The outer edge of the raised portion 126ª of the bed plate projects slightly beyond the outer edge of the turntable 40, and the inner edge thereof lies closely adjacent the outer ends of grooves 50. The bed plate is provided with a slot 127 narrower than the slots 48 in turntable but sufficiently wide and deep to receive the saw 74. It will thus be seen that the blank will be supported throughout its length during the cutting action of saw 74 by the bottom of groove 50 and that portion of the bed plate at each side of slot 127. The bed plate 126 is formed with a flaring notch 128 through which cutters 88 are adapted to pass, said plate and the bottom of groove 50 serving to firmly support the pin blank during the time it is being acted upon by the rotary cutter.

During the cutting action of saws 100 the pin blank is supported by the raised portion 126ª of the bed plate and by the bottom of groove 50, as shown in Fig. 24, the bed plate not being slotted at this point since the saws 100, as above described, do not cut entirely through the pin blank. The gear box 115 and saws 114 extend between the flanges 134 on the bed plate 126 and the top portion 126ª of the bed plate is cut away at 135 between said flanges. The pin blanks are held down against the upward pressure of saws 114 by a plate 136 which overlies the gear box 115 and the edge of the turntable 40. The plate 136 is secured by suitable screws to the top edges of the brackets 133, and the slots 48 in the turntable travel under the inner portion of said plate, as shown in Figs. 1 and 30.

The bed plate 126 is provided with a notch 137 slightly wider and deeper than the slots 48, through which notch the discharge finger 69 forces the pin into the discharge chute 68.

It will be understood that the usual flared slot in the pin will be formed in any manner so far as my invention is concerned. I have shown two cutters for doing this work, the first one cutting nearly a straight slot and the second one serving to flare the slot, but it will be understood that both these cutters may be embodied in one cutter if desired.

What I claim is:

1. In a clothes-pin-making machine, a turntable and means for intermittently rotating it, blank-clamps carried thereby to hold the pins radially with respect to the turntable, means for feeding the blanks to said clamps and means for discharging them therefrom after they have been operated upon, and mechanisms arranged around the turntable for first forming a flared slot in the end of the blank and subsequently cutting an inclined kerf longitudinally through each leg of the blank.

2. In a clothes-pin-making machine, a turntable and means for intermittently operating it, means for securing the blanks thereon and for discharging them therefrom, means for slotting the ends of the blanks, and means for forming an angular kerf or slot in each leg of the blank embodying a pair of saws adapted to partially cut these kerfs in the top side of the blank and an additional similar pair of saws adapted to finish the kerfs from the bottom side of the blank.

3. In a clothes-pin-making machine, a turntable and means for intermittently rotating it, means for clamping the blanks radially thereon, means for cutting the usual slot in the end of the clothes-pin, and means for cutting an inclined kerf in each leg of the clothes-pin embodying two pairs of saws, one adapted to work against the one side of the pin and the other adapted to work against the other side of the pin to complete the kerfs, each pair of saws being mounted in an oscillating gear box, said box containing the driving mechanism of the saws.

4. In a clothes-pin-making machine, the combination of a turntable provided with a series of radially extending slots around its outer edge adapted to receive the body portions of headed blanks, one face of said turntable being formed at the inner end of each slot with a depression adapted to receive the head of a blank, a plurality of bell-crank levers pivotally mounted on the turntable on axes extending radially of the turntable and each provided at one end with an arcuate blank-clamping shoe having its gripping surface formed with a rib adapted to engage the usual reduced portion of a blank below the head of the blank, spring means normally tending to rock the bell-cranks levers in one direction to cause the clamping shoes to move to clamping position, means for operating on blanks while clamped by said shoes, and stationary means located in the path of the other ends of the bell-crank levers for rocking the levers in opposition to said spring means to release the blanks.

5. In a clothes-pin-making machine, the combination of a turntable provided with a series of radially extending slots around its outer edge adapted to receive the body portions of headed blanks, one face of said turntable being formed at the inner end of each slot with a depression adapted to receive the head of a blank, a plurality of bell-crank levers pivotally mounted on the turntable on axes extending radially of the turntable and each provided at one end with an arcuate blank-clamping shoe having its gripping surface formed with a rib adapted to engage the usual reduced portion of a blank below the head of the blank, spring means normally tending to rock the bell-crank levers in one direction to cause the clamping shoes to move to clamping position, means for operating on blanks while clamped by said shoes, rollers journaled on the other ends of said bell-crank levers, and a stationary arcuate bar above the turntable adapted to be engaged by said rollers to rock the levers in opposition to said springs means.

6. In a clothes-pin-making machine, the combination of a horizontally supported turntable having a series of radially extending blank-receiving slots in its outer edge, means for intermittently rotating the table, an inclined blank-feed chute down which the blanks are adapted to roll located beyond the perimeter of the turntable, means forming a channel extending across the lower end of the chute of less depth than the diameter of a blank and adapted to receive and support a single blank transversely of the chute with the upper edge of the blank above the bottom of the chute to prevent additional blanks leaving the chute, a plunger, head, means for reciprocating the plunger head in said channel across the chute to force a blank endwise into one of the slots in the turntable, and a rod extending rearwardly from the plunger head for preventing a blank from rolling into said channel during reciprocation of the plunger.

7. In a clothes-pin-making machine, a turntable having a series of radial slots in its edge adapted to snugly grasp the blank along opposite sides, means for intermittently rotating the table, and means for forcing the blanks into said slots comprising a chute and a reciprocating plunger arranged to force the blanks endwisely head-on into said slots.

8. In a clothes-pin-making machine, a slotted turntable and means for operating on blanks held in said slots, and means for forcibly discharging the blanks from said slots, consisting of a continuously-rotating finger adapted to pass through each of said slots as the turntable steps past the finger.

9. In a clothes-pin-making machine, a turntable provided with a plurality of radial slots each of which is adapted to snugly fit the blank to be operated upon and each of which terminates in a head-rest pocket, means for operating on the blanks while thus fitted in said slots, and means for dislodging the completed clothes-pins from said slots consisting of a finger adapted to pass through the outer end of each of said slots and embodying a tilting member and an ejecting member.

10. In a clothes-pin-making machine, a turntable provided with a plurality of radial slots each of which is adapted to snugly fit the blank to be operated upon and each of which terminates in a head-rest pocket, means for operating on the blanks while thus fitted in said slots, and means for dislodging the completed clothes-pins from said slots consisting of a finger adapted to pass through the outer end of each of said slots and embodying a tilting member and an ejecting member, means being provided for continuously rotating said finger so as to first tilt the pin to an angle with reference to the turntable and then forcibly eject it from the slot.

11. In a clothes-pin-making machine, the combination of a rotary blank support having blank-receiving slots extending radially inward from its outer edge, means for clamping the inner ends of radially extending blanks confined in said slots to said support adjacent the inner ends of the slots, a plurality of rotary saws located adjacent opposite faces of the support at circumferentially spaced points and movable bodily transversely of the plane of said support into and out of said slots, means for actuating said saws, and stationary thrust take-up members adjacent opposite faces of the slotted edge of the blank support at circumferentially spaced points, one of said members being located opposite each saw and adapted to engage the unsupported outer portion of a blank being operated on by said saw.

12. In a clothes-pin-making machine, a turntable having a series of radial slots in its edge, means for intermittently rotating the table, and means for forcing the blanks into said slots comprising a chute and a reciprocating plunger arranged to force the blanks endwisely head-on into said slots, means being provided for camming said pin-blanks endwisely back into the slots should they move radially outwardly after being forced in.

13. In a clothes-pin-making machine, a turntable having a series of radial slots in its edge, means for intermittently rotating the table, and means for forcing the blanks into said slots comprising a chute and a reciprocating plunger arranged to force the blanks endwisely head-on into said slots, a cam being provided for pushing the pin-blanks back into the slots should they move radially outwardly after being pushed home, said cam being arranged adjacent to the outer edge of the turntable.

14. In a clothes-pin machine, a turntable and means for intermittently rotating it, said turntable being radially slotted for the reception of the pin-blanks, a bed-plate around the edge of the table adapted to coöperate with the turntable in supporting the pin-blanks while in the slots, said bed-plate being provided with a radial slot narrower than each of the pin-slots in the turntable, and a cutting implement adapted to work through the slot in the bed-plate as well as each of the slots in the turntable, whereby the pin-blank will be supported by the bed-plate during the cutting action.

15. In a clothes-pin machine, a slotted turntable, a bed-plate around the edge of the same and having its pin-supporting surface flush with the pin-supporting surfaces of the turntable whereby each pin will be supported both by the turntable and the bed-plate, and means for operating on the pin-blank while thus supported.

16. In combination with a turntable having radial slots adapted to snugly receive a pin-blank and support its inner end, a thrust-plate adjacent the outer edge of the turntable, and a cutting implement adapted to operate on the pin-blank while in the slot and while being thrust against said thrust-plate, whereby the turntable and the thrust-plate coöperate to solidly hold the pin-blank while being operated on.

This specification signed this eighteenth day of August, A. D. 1919.

BENJAMIN W. TUCKER.